United States Patent [19]

Matthews et al.

[11] Patent Number: 5,227,349
[45] Date of Patent: Jul. 13, 1993

[54] PROCESS FOR PRODUCING A KAOLIN CLAY PRODUCT

[75] Inventors: Kirt L. Matthews, Rock Hill, S.C.; William E. Thompson, Sandersville, Ga.

[73] Assignee: ECC International Inc., Atlanta, Ga.

[21] Appl. No.: 934,179

[22] Filed: Aug. 21, 1992

Related U.S. Application Data

[63] Continuation-in-part of Ser. No. 701,296, May 13, 1991, abandoned, which is a continuation of Ser. No. 409,839, Sep. 20, 1989, abandoned.

[51] Int. Cl.$^5$ ............................................. C04B 33/04
[52] U.S. Cl. ..................................... 501/145; 501/146; 501/149; 106/486; 106/488
[58] Field of Search .................. 501/146, 149, 145; 106/486, 488

[56] References Cited

U.S. PATENT DOCUMENTS

| | | | |
|---|---|---|---|
| 3,980,547 | 9/1976 | Kunkle | 204/180 R |
| 4,003,811 | 1/1977 | Kunkle | 204/180 R |
| 4,110,189 | 8/1978 | Kunkle et al. | 204/180 R |
| 4,246,039 | 1/1981 | Mixon, Jr. | 106/288 B |
| 4,312,729 | 1/1982 | Wills | 204/180 P |
| 4,331,525 | 5/1982 | Huba et al. | 204/181 F |
| 4,381,948 | 5/1983 | McConnell et al. | |
| 4,604,174 | 8/1986 | Bollinger et al. | 204/151 |
| 4,619,747 | 10/1986 | Hoadley et al. | 204/182.3 |
| 4,639,300 | 1/1987 | Culkin | 204/182.3 |
| 4,642,904 | 2/1987 | Smith, Jr. | |
| 4,650,521 | 3/1987 | Koppelman et al. | |
| 4,670,118 | 6/1987 | Klinkowski | 204/182.2 |
| 4,671,874 | 6/1987 | Fremont et al. | 210/243 |
| 4,687,546 | 8/1987 | Willis | |
| 4,693,802 | 9/1987 | Culkin | 204/182.4 |

OTHER PUBLICATIONS

Koch Membrane Systems, Inc., "Proven Membrane Technology for Today-and Tomorrow", May, 1988.

*Primary Examiner*—Mark L. Bell
*Assistant Examiner*—Paul Marcantoni
*Attorney, Agent, or Firm*—Klauber & Jackson

[57] ABSTRACT

A process for producing a high solids aqueous slurry of a beneficiated kaolin. An impure crude kaolin clay is initially subjected to wet processing including a size classification step, to recover a beneficiated fine particle size kaolin fraction which is formed into a dilute aqueous slurry of deflocculated kaolin particles. The dilute slurry is filtered by flowing it generally parallel to and in contact with the surface of a microporous barrier while maintaining a pressure drop across the barrier in a direction transverse to the slurry flow. A gel permeation layer is thereby formed of kaolin overlying the surface of the microporous barrier. The gel permeation layer and underlaying surface are substantially impervious to the passage of clay solids while being pervious to the passage of water molecules, ions and dissolved salts; whereby water molecules, ions and dissolved salts are caused to pass through the barrier, thereby increasing the concentration of the solids in the kaolin slurry. The water having passed through the barrier as a substantially solids-free permeate is collected and, the retentate is collected as a more concentrated aqueous slurry of beneficiated kaolin particles. Additional water may be thermally evaporated from the more concentrated aqueous slurry to provide a higher solids product slurry.

42 Claims, 8 Drawing Sheets

2nd STAGE FLUX RATES

2nd STAGE % SOLIDS

3rd STAGE FLUX RATES

3rd STAGE % SOLIDS

1st STAGE DELTA FLUX RATES

1st STAGE % SOLIDS

2nd STAGE DELTA FLUX RATES

2nd STAGE % SOLIDS

3rd STAGE DELTA FLUX RATES

3rd STAGE % SOLIDS

PROCESS FOR PRODUCING A KAOLIN CLAY PRODUCT

RELATED APPLICATIONS

This application is a continuation-in-part of copending application Ser. No. 701,296, filed May 13, 1991, now abandoned, which in turn is a continuation of Ser. No. 409,839, filed Sep. 20, 1989 now abandoned.

BACKGROUND OF THE INVENTION

The present invention relates generally to the processing of clay and, more particularly, to an improved method for concentrating a beneficiated aqueous kaolin clay slurry which includes at least partially dewatering the kaolin clay slurry via filtration through a microporous barrier, thereby eliminating clay loss commonly encountered during dewatering via conventional techniques.

Kaolin clay has many known applications in industry, including use as a filler in papermaking, a coating for paper, and a pigment in paint. However, crude kaolin clay typically contains various impurities which cause discoloration. Additionally, crude kaolin is typically too abrasive for direct use in these products. Therefore, it is necessary to beneficiate the crude kaolin clay to increase the brightness of the kaolin by removing discolorating impurities and to decrease its abrasiveness by reducing the particle size of the kaolin particles.

In general, such processes for beneficiating crude kaolin clay require that the clay be refined via wet processing as a low solids slurry. Therefore, it is necessary to add substantial amounts of water to the dry crude kaolin clay to form a clay suspension or slurry having a low solids content, generally below 50% solids by weight and typically in the range of 15% to 40% solids by weight. However, for commercial applications, the beneficiated clay slurry must have a much higher solids content. Typically beneficiated kaolin clays are shipped commercially for use in paper making, paper coating and paint making as a high solids slurry having a solids content in the range of 65% to 75% by weight. Therefore, most of the water added to the dry kaolin clay must be removed in order to concentrate the clay solids.

In conventional prior art methods for refining kaolin clay via wet-processing, the crude kaolin clay is dispersed in water, usually with the aid of a dispersing agent, to form a flowable aqueous suspension or slurry. Typically, the aqueous crude clay suspension is then subjected to a fractionation operation to remove coarse and abrasive grit. This fractionation operation is conventionally carried out by centrifugation of the dispersed aqueous clay slurry. Typically, the aqueous kaolin clay slurry is fed to the centrifuge at a solids content in the range of 45% to 50% solids. The fine particle-size fraction, generally 90% finer than 2 microns equivalent spherical diameter in particle size, is recovered as a more dilute dispersed aqueous clay slurry, typically having a solids content ranging from 30% to 40% solids by weight, while the coarser fraction is discarded.

Following fractionation, the recovered aqueous clay slurry may be passed through a magnetic collector to remove at least a portion of any iron-based impurities therefrom. Such impurities discolor the kaolin and, if not removed, reduce the brightness of the beneficiated end product. Alternatively, but usually in conjunction with and subsequent to the magnetic separation operation, the aqueous clay slurry is subjected to a bleaching step to remove insoluble iron impurities by reducing the iron therein from the insoluble ferric state to the soluble ferrous state. For such bleaching to be effective, the aqueous kaolin clay slurry must be chemically flocculated, typically by acidifying the aqueous kaolin clay slurry prior to the bleaching operation by admixing therewith an aqueous acidic solution, such as dilute sulfuric acid, in an amount sufficient to reduce the pH of the aqueous kaolin clay slurry to a level in the range of 2.5 to 3.5. Additionally, the solids content of the aqueous kaolin clay slurry is typically reduced to a level of 20% to 30% solids by weight prior to the bleaching operation. The bleaching is carried out by contacting the aqueous kaolin clay slurry with a bleaching agent. The bleached kaolin clay slurry is fully beneficiated at this point and must now be dewatered and further dried to bring the kaolin slurry to commercially acceptable levels.

To dewater a beneficiated clay slurry by conventional prior art practice, the low-solids slurry is typically first passed to a mechanical filter or a electrofilter wherein a limited portion of the water is removed from the slurry. Conventional filters customarily used to carrying out this initial dewatering step include hydrocyclones, filter presses, rotary vacuum filters, electrically augmented vacuum filters, and various electrofilters utilizing electrokinetic phenomena such as electrophoresis and electroosmosis. Such conventional dewatering equipment consumes considerable energy when utilized in commercial scale clay processing plants. Additionally, the filtrate from such conventional filters generally contains from 1% to 3% by weight of fine clay particles which should be removed from the filtrate at least for economic reasons. To recover clay fines from the filtrate, it is conventional practice to pass the filtrate to a sedimentation reservoir wherein the filtrate is held in a relatively quiescent state to permit the clay particles to settle out of the filtrate and collect as a sediment at the bottom of the sedimentation reservoir. When so processing the filtrate to remove carry over solids, various polymers are typically added to the filtrate to improve and hasten solids sedimentation. This addition of polymers to the filtrate not only increases processing costs, but also any excess polymer contained in the clarified supernant water removed from the sedimentation reservoir presents a potential pollution problem if the clarified water is transferred to an impound pond and also may prevent recycle of the clarified water for further use in the clay processing plant.

Typically, when the aqueous kaolin clay slurry is supplied to such a conventional filter, it has a low solids content ranging from 20% to 30% by weight, and the filter cake from the filter would have a solids content of about 50% to 60% by weight. Thus, the slurry would still comprise about 40% to 50% water. Further dewatering on such conventional filters is impractical due to the fine particle size of the solids in the beneficiated clay slurry. Therefore, it is necessary to resort to thermal means to further dewater the beneficiated clay slurry to a commercially acceptable solids content.

Typically, at least a portion of the partially dewatered slurry is passed through a spray dryer or other direct contact-type evaporator such as a gas-fired kiln, wherein the clay slurry is contacted with a drying medium, having a temperature of 1000° F. or more, such as hot air or hot flue gas typically generated from the combustion of natural gas. It is customary to pass only a portion, typically about 30% to 50%, of the clay slurry through the spray dryer and then to remix the thoroughly dried clay slurry from the spray dryer with the remaining portion of partially dewatered slurry in a high shear mixer to produce a product clay slurry having a solids content of 65% to 75%.

A problem associated with concentrating clay slurries in spray dryers is that spray drying is a relatively inefficient process and considerable energy must be consumed in the spray drying process in order to evaporate the water in the clay slurry. In conventional prior art spray drying systems used for concentrating clay slurries, the water vapor evaporated from the clay slurry in the drying process is typically vented to the atmosphere in the exhaust gas from the dryer. Thus, the energy expended in evaporating the water vapor is wasted.

Alternatively as disclosed in commonly assigned U.S. Pat. No. 4,687,546, the partially dewatered beneficiated kaolin clay slurry from the preliminary filtering step may be further concentrated by evaporating water therefrom by passing the aqueous clay slurry through one or more non-contact evaporative heat exchangers in heat exchange relationship with a heating vapor comprising water vapor previously evaporated from the clay slurry. In this manner, an energy efficient process is provided for concentrating a beneficiated aqueous clay slurry in that use is made of the heat normally wasted when the flue gas from the spray dryer, together with the water vapor evaporated from the clay during the spray drying process, is vented to the atmosphere. Further, by using indirect heat exchange between the aqueous clay slurry and the heating vapor as a means of evaporating water vapor from the clay slurry, the formation of agglomerates typically encountered in direct contact evaporators is avoided. Additionally, as direct contact with the heating gas is avoided, no degradation in brightness is experienced.

It is an object of the present invention to provide a method for concentrating an aqueous clay slurry by forcing liquid in the slurry through a microporous barrier, such as a semi-permeable membrane, via a positive gage pressure differential without electrical assist, whereby the filtrate liquid, i.e. the permeate, removed from the aqueous clay slurry is substantially free of carry over clay solids thereby eliminating the need to further process the filtrate liquid to recover clay solids.

It is a further object of the invention, to provide a method of the foregoing character, which can effectively filter highly dilute slurries of fully dispersed fine kaolin particles, which is susceptible of operation in a continuous dynamic mode, and which can operate for relatively extended time periods without diminution of effectiveness.

A still further object of the invention is to provide a method as discussed, which can readily filter extremely fine kaolin particles, including particles having even smaller dimensions than the pore size of the microporous barrier utilized.

It is a yet further object of the present invention to provide a process for producing a kaolin clay product comprising beneficiated fine-particle size kaolin clay particles in an aqueous slurry at a commercially shippable solids level, wherein the slurry of beneficiated kaolin clay is at least in part dewatered through the use of a membrane filter, such as a polymeric ultrafiltration membrane.

SUMMARY OF THE INVENTION

Now in accordance with the present invention, a process is provided for producing a high solids aqueous slurry of a beneficiated kaolin, according to which an impure crude kaolin clay is initially subjected to wet processing including a size classification step, to recover a beneficiated kaolin fraction having a particle size distribution such that at least 90% by weight of said particles are of less than 2 microns E.S.D. The kaolin fraction is formed into a dilute aqueous slurry of deflocculated kaolin particles dispersed in water. The dilute aqueous slurry of dispersed kaolin particles is filtered by flowing the slurry generally parallel to and in contact with the surface of a microporous barrier while maintaining a pressure drop across the barrier in a direction transverse to the slurry flow. Typical pressure drops across the barrier can be in the range of 20 to 80 p.s.i. A gel permeation layer is thereby formed of kaolin overlying the surface of the microporous barrier which borders the slurry flow. The gel permeation layer and underlaying surface are substantially impervious to the passage of clay solids therethrough while being pervious to the passage therethrough of water molecules, ions and dissolved salts; whereby water molecules, ions and dissolved salts are caused to pass through the barrier, thereby increasing the concentration of the solids in the kaolin slurry. The water having passed through the barrier as a substantially solids-free filtrate (or "permeate") is collected and, separately therefrom, the retentate is collected as a more concentrated aqueous slurry of beneficiated kaolin particles. Additional water may be thermally evaporated from the more concentrated aqueous slurry of beneficiated kaolin particles to provide a higher solids product slurry.

The microporous barrier may comprise a semipermeable membrane such as a polymeric ultrafiltration membrane. Similarly the microporous barrier can comprise a thin sintered metal layer. The barrier will generally have an average pore size of from 0.005 to 2 $\mu$m with a preferable range being from 0.005 to 0.1 $\mu$m. The method of the invention is so effective that an aqueous slurry of fully dispersed kaolin particles wherein at least 95% by weight are of less than 0.5 $\mu$m E.S.D., and over 70% by weight are of less than 0.25 $\mu$m, can still be filtered, even at typical dilutions of 2% to 6% kaolin solids. These kaolin fines are readily and usefully recovered by the invention, which yields a substantially solids-free permeate.

In one aspect of the present invention, a method of concentrating solids in an aqueous clay slurry is provided wherein liquid in the slurry is removed by contacting the aqueous clay slurry with a semi-permeable membrane, preferably by passing the dilute aqueous slurry of beneficiated kaolin along a surface of a semipermeable membrane, while imposing a pressure differential across the membrane surface whereby water molecules are caused to pass through said semi-permeable membrane thereby increasing the concentration the solids in said kaolin slurry in the direction of flow as said kaolin slurry passes along said membrane. The semi-permeable membrane provided is substantially impervious to the passage of clay solids therethrough, but pervious to the passage of water molecules, ions and dissolved salts therethrough. The liquid having passed through the membrane, i.e. the permeate contains only ions and dissolved salts, such as the sulfates and chlorides of iron, potassium, calcium, or sodium. The aqueous kaolin slurry having passed over the membrane surface is collected separately from the permeate as a more concentrated aqueous slurry of beneficiated fine-particle size kaolin particles. The filtrate liquid so removed from the aqueous clay slurry is substantially free of carry over clay solids, that is no solids or so little solids that the need to further process the filtrate liquid to recover clay solids, which is necessary when using conventional dewatering equipment, is eliminated. Additionally, as undesirable soluble salts, such as residual salts from the bleaching process, pass through the membrane filter with the permeate, this method of dewatering the kaolin clay slurry may advantageously be employed in rinsing the beneficiated kaolin to remove residual bleaching salts therefrom which would otherwise degrade the brightness of the beneficiated kaolin product.

In accordance with a further aspect of the present invention, a process is provided for producing a high brightness kaolin clay product comprising beneficiated fine-particle size kaolin clay particles in an aqueous slurry at a solids content of at least 65% by weight. In said process, impure crude kaolin clay is subjected to wet processing in such a manner as to provide a dilute aqueous slurry of beneficiated fine-particle size kaolin particles dispersed in water. To dewater this dilute aqueous slurry of beneficiated kaolin to a commercially shippable level, the dilute aqueous slurry, typically at a solids level in the range of about 15% by weight to less about 40% by weight, is subjected to membrane filtration as outlined above and hereinafter further described to provide a more concentrated aqueous slurry of beneficiated fine-particle size kaolin particles, typically having a solids level in the range of about 40% by weight to about 50% by weight, and a substantially solids-free filtrate. Thence, this more concentrated aqueous slurry is subjected to thermal drying to evaporate additional water from the more concentrated aqueous slurry of beneficiated fine-particle size kaolin particles to provide a product slurry having a solids content of at least 65% solids by weight.

To initially concentrate the dilute aqueous slurry of beneficiated fine-particle size kaolin particles dispersed in water, typically at a solids level in the range of about 15% by weight to less about 40% by weight, to a more concentrated slurry, typically having a solids level in the range of about 40% by weight to about 50% by weight, the dilute aqueous slurry of beneficiated kaolin is contacted with a semi-permeable membrane, preferably by passing the beneficiated kaolin slurry along a surface of a semi-permeable membrane in a flow substantially parallel to the membrane surface, while imposing a pressure differential across the membrane surface. Water molecules, ions and dissolved salts pass through said semi-permeable membrane as the kaolin slurry passes along the membrane surface thereby increasing the concentration the solids in said kaolin slurry in the direction of flow as said kaolin slurry passes along said membrane. The membrane is substantially impervious to the passage of clay solids therethrough, but pervious to the passage of water molecules, ions and dissolved salts therethrough. The water having passed through the membrane is collected as a substantially solids-free filtrate, while the aqueous kaolin slurry having passed over the membrane surface is collected separately therefrom as a more concentrated aqueous slurry of beneficiated fine-particle size kaolin particles.

DESCRIPTION OF THE PREFERRED EMBODIMENT

In order to be useful as paper fillers, paper coatings, paint extenders, and for other industrial purposes, naturally occurring kaolin crude clays are subjected to wet processing to remove grit thereby reducing the abrasiveness of the clay and to remove discoloration impurities thereby upgrading the brightness of the clay.

Figure 1:
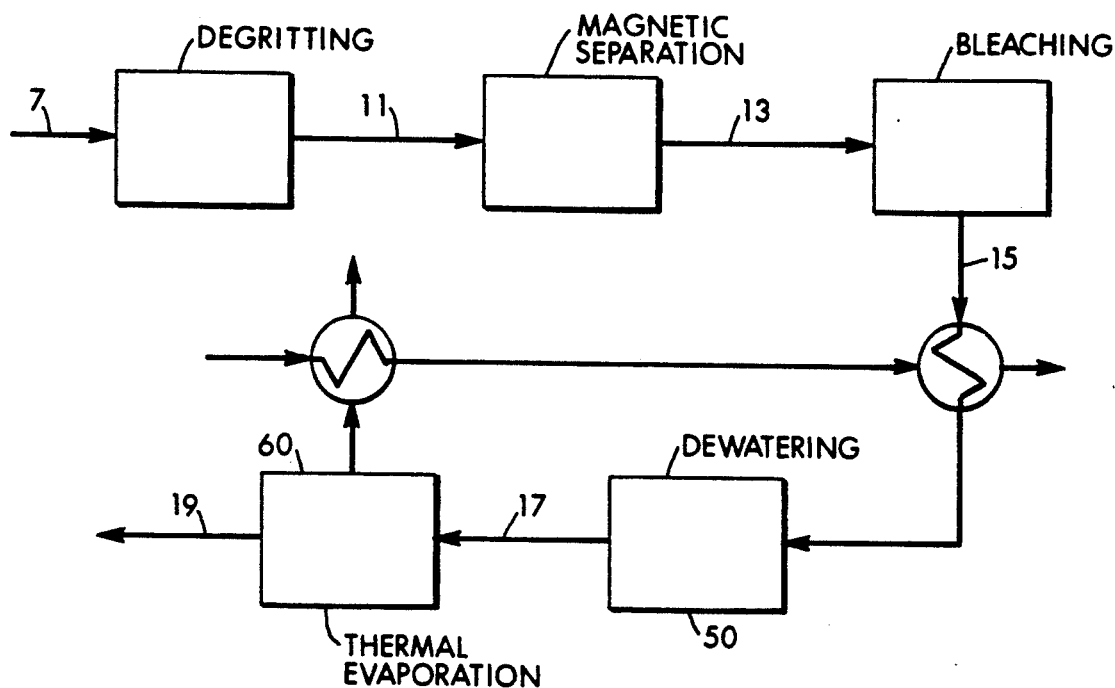
FIG. 1 is a schematic block diagram illustrating the beneficiating of kaolin clay in accordance with the process of the present invention.

In the wet processing of crude kaolin, as illustrated schematically in FIG. 1, the crude kaolin is, as in conventional processing, blunged in water, preferably in the presence of a water-soluble dispersing agent, to form an aqueous suspension or slurry 7 of kaolin lay particles at a low solids content, that is less than about 50% by weight, and generally in the range of 15% to 40% solids by weight. The dispersing agent added to the slurry may be any one of a number of known, commercially available dispersants including, but not limited to, tetrasodium pyrophosphate, trisodium phosphate, sodium hexametaphosphate, tetrasodium phosphate, sodium tripolyphosphate, sodium silicate, sodium carbonate, sodium salts of weak acids, such as condensed naphthalene sulfonic acid and polymeric carboxyolic acid, and water-soluble organic polymeric salts, such as sodium polyacrylate and sodium polymethacrylate.

The aqueous kaolin clay slurry 7 formed in the blunging operation is subjected to a degritting operation wherein coarse material is removed therefrom in order to reduce the abrasiveness of the slurry. To degrit the slurry, the crude kaolin slurry 7 is preferably first passed through a screen to remove coarse oversize material and then subjected to centrifugation to fractionate the slurry into an oversize fraction 9 containing the grit and a fine fraction of degritted clay slurry 11. The centrifugation of the clay slurry is carried out by conventional means to yield a degritted fine-particle size kaolin clay slurry 11 having a particle size distribution of at least about 90% by weight of particles less than 2 microns in equivalent spherical diameter. The degritted kaolin clay slurry 11 will have a reduced solids content relative to the crude kaolin slurry supplied to the centrifuge. Typically, the degritted kaolin clay slurry 11 will have a solids content in the range of about 30% to about 40% by weight.

Following degritting, the aqueous kaolin clay slurry 11 may be subjected to magnetic separation to remove certain ferromagnetic impurities therefrom. To carry out the magnetic separation, the aqueous kaolin clay slurry is passed through a matrix of ferromagnetic material positioned in a high intensity magnetic field. As the slurry flows through the matrix, ferromagnetic material in the slurry is attracted to and adheres to the matrix material which itself is magnetized by the magnetic field enveloping the matrix. As the ferromagnetic material in the clay is a discoloration impurity, the aqueous kaolin clay slurry 13 having passed through the magnetic matrix 40 has an improved brightness relative to the aqueous kaolin clay slurry 11.

To further improve the brightness of the kaolin clay, the aqueous kaolin clay slurry 13 is subjected to a bleaching step wherein the remaining iron-based discoloration impurities are removed. To bleach the clay, the aqueous kaolin clay slurry 13 is contacted with a reducing agent preferably by admixing into the kaolin clay slurry an aqueous solution of the reducing agent. Any one of a number of commercially available reducing agents may be utilized to bleach the kaolin, including, but not limited to, sodium dithionite, sodium hypochlorite, sodium hyposulfite, sodium perborate, sodium perchlorate, or other cationic metal salts of the dithionite ion, the hypochlorite ion, the hyposulfite ion, the periodixe ion, the perborate ion, or the perchlorate ion. Of course, admixing the aqueous solution of reducing agent into the clay slurry results in further dilution of the clay slurry. Thus, the beneficiated kaolin clay slurry 15 output from the bleaching operation will have a further reduced solids content, typically in the range of 20% to 30% solids by weight.

As noted hereinbefore, to be commercially marketable and economically shippable, the beneficiated kaolin clay product, while in slurry form, must have a high solids content. Typically, the shippable product slurry will have a solids content of at least 65% by weight and, most advantageously, a solids content in the range of 70% to 75% by weight. To concentrate the beneficiated kaolin clay slurry to the desired high solids level, the dilute aqueous kaolin clay slurry is first passed through a dewatering filter 50, to remove a first portion of water therefrom as a filtrate liquid. The partially dewatered slurry 17 is then passed through a thermal evaporator 60 wherein additional water is removed from the aqueous clay slurry 17 as a vapor by thermal evaporation. Typically, the partially dewatered slurry 17 from the dewatering filter 50 has solids content of about 50% to about 60% by weight. Thus, the slurry 17 still contains about 40% to 50% water. Accordingly, the further drying by thermal evaporation is required to further concentrate the solids in the slurry to provide the beneficiated kaolin clay product 19 as a commercially marketable and shippable slurry having a solids content in the range of 65% to 75% solids by weight.

In accordance with the present invention, the dewatering filter means 50 for partially dewatering the dilute aqueous clay slurry 15 from a low solids content, typically 20% to 30% by weight solids, to a more concentrated partially dewatered aqueous clay slurry 17, typically having a solids content ranging from about 50% to about 60% solids by weight, may comprise a membrane filter means 70 wherein the dilute aqueous slurry 15 of beneficiated kaolin particles is brought in contact with a semi-permeable membrane which is substantially impervious to the passage of clay solids therethrough and pervious to the passage therethrough of water molecules, ions and dissolved salts. As the dilute aqueous slurry 15 of beneficiated kaolin particles is in contact with the semi-permeable membrane, a pressure differential is imposed across the membrane which drives water molecules, ions and dissolved salts through the membrane to be collected as a substantially solids-free permeate, thereby increasing the concentration of kaolin solids in the aqueous slurry.

The thermal evaporator 60 may comprise a direct contact evaporative dryer apparatus such as a spray dryer. A first portion of the partially dewatered kaolin clay slurry 17 is passed to the evaporative dryer and directly contacted therein with a hot drying gas whereby substantially all of the water in this portion of the aqueous clay slurry 17 is removed therefrom by thermal evaporation and entrained in the drying gas exhausted from the evaporative dryer. The dry solids fall out of the drying gas and are collected as a dried clay product having a residual water content typically of less than 1% by weight. This dried kaolin powder is then remixed with the remaining portion of the 50% to 60% solids aqueous clay slurry in an amount sufficient to raise the solids content of the resultant kaolin clay product slurry to the desired level above 65% solids by weight, and typically to a level between 70% and 75% solids by weight, thereby providing the shippable commercially marketable kaolin clay product 19.

In accord with the process disclosed in commonly assigned U.S. Pat. No. 4,642,904, the entire disclosure of which is hereby incorporated by reference, the drying gas exhausted from the evaporative dryer is contacted in a cooling tower with cooling liquid to cause at least a portion of the water vapor evaporated from the aqueous clay slurry to condense. All or a first portion of the condensate may be passed in heat exchange relationship with the aqueous clay slurry 15 passing to the dewatering filter means 50 so as to preheat the clay slurry prior to filtration or all or a second portion of the condensate may be passed in heat exchange relationship with the partially dewatered clay slurry 17 passing from the filtration step so as to preheat the partially dewatered clay slurry prior to evaporative drying, or all or a third portion of the condensate may be passed in heat exchange relationship with ambient drying gas so as to preheat the drying gas being supplied to the evaporative dryer. The cooled condensate is advantageously recycled to the cooling tower to serve as cooling liquid for contacting with the drying gas exhausted from the evaporative dryer.

More advantageously, the thermal evaporator 60 may comprise a non-contact evaporator heat exchanger apparatus as disclosed in commonly assigned U.S. Pat. No. 4,687,546, the entire disclosure of which is also incorporated herein by reference. In accord with the process disclosed therein, the beneficiated aqueous kaolin clay slurry 17 is concentrated from a solids content of about 50% to 60% by weight to a desired solids content of at least 65% by weight by thermally evaporating water therefrom by passing the aqueous clay slurry 17 through one or more non-contact evaporative heat exchangers wherein the clay slurry is passed in indirect heat exchange relationship with a heating medium. This non-contact process for thermally evaporating the slurry is particularly attractive for use in concentrating kaolin clays as water may be evaporated from the clay slurry without the formation of agglomerates or the deterioration of clay brightness inherent in contact-type evaporative drying process.

In accord with the process disclosed in U.S. Pat. No. 4,687,546, a continuous stream of clay slurry to be concentrated may be passed through a single non-contact type heat exchanger, or a plurality of non-contact evaporative heat exchangers disposed in series, in indirect heat exchange relationship with recycled water vapor. That is, water vapor evaporated from the clay slurry in the heat exchanger is collected, compressed to increase its temperature, and recycled to the evaporative heat exchanger or heat exchangers as the heating vapor to evaporate water from the incoming clay slurry. In this manner, an energy efficient process is provided for concentrating a beneficiated aqueous clay slurry in that use is made of the heat normally wasted when the flue gas from the spray dryer together with the water vapor evaporated from the clay during the spray drying process is vented to the atmosphere.

Figure 2:
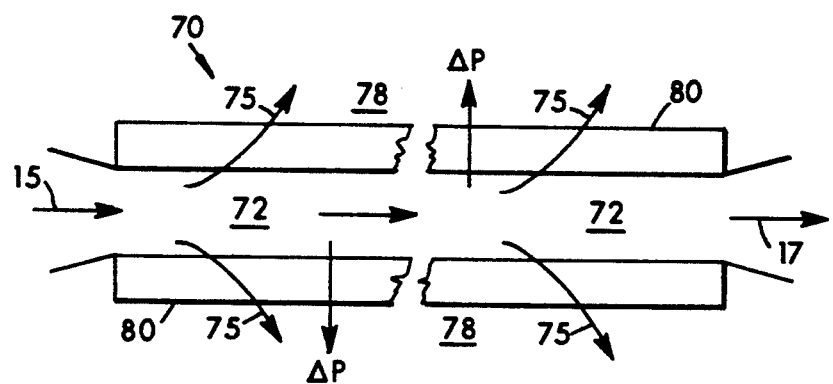
FIG. 2 is a sectional elevation view illustrating the method of the present invention of concentrating solids in a kaolin slurry via membrane filtration.

As previously noted, in accordance with the present invention, the dewatering filter means 50 for partially dewatering the dilute aqueous clay slurry 15 from a low solids content, typically 20% to 30% by weight solids, to a more concentrated partially dewatered aqueous clay slurry 17, typically having a solids content ranging from about 50% to about 60% solids by weight, may comprise a membrane filtration means. Referring now to FIG. 2, an individual membrane filter element 70 most advantageously comprises an axially elongated slurry flow channel 72 bounded at least in part along the length thereof by a semi-permeable membrane 80 which is in turn bounded by a permeate collection passage 78. That is, the semi-permeable membrane is disposed intermediate the slurry flow channel and the permeate collection passage. The semi-permeable membrane is permeated by a multitude of micropores so as to render the membrane previous to liquid, ions and dissolved salts, but impervious to clay solids. Conventionally, a membrane filter module incorporates a plurality of individual membrane filter elements 70 innerconnected in series-flow arrangement.

Various commercially available configurations of membrane filters may be used in carrying out the process of the present invention, including without limitation plate and frame membrane filters, tubular membrane filters. In each of such systems, an axially elongated flow channel 72 having an inlet at one end thereof for receiving the dilute aqueous kaolin slurry 15 and an outlet at the other end thereof for discharging the more concentrated aqueous kaolin slurry 17 is provided which is bounded along at least a part of its length by a semi-permeable membrane 80 selected to be impervious, or nearly so, to the passage of clay solids therethrough and previous to the passage of water molecules, ions and dissolved salts therethrough.

In any case, the aqueous clay slurry to be concentrated is passed axially at a preselected flow rate and under a selected pressure through the flow passageway defined within the elongated flow channel in a substantially parallel flow over the surface of the bounding semi-permeable membrane, a portion of the liquid, together with ions and dissolved salts, in the aqueous clay slurry passes perpendicularly through the semi-permeable membrane surface bordering the flow passageway into the permeate flow passage and is collected in the permeate collection passage 78 as a filtrate 75 and conducted away for reuse in the kaolin beneficiation process. The reuse of this filtrate is possible as the filtrate is substantially solids free due to the substantially solids impervious nature of the semi-permeable membrane.

Figure 3:
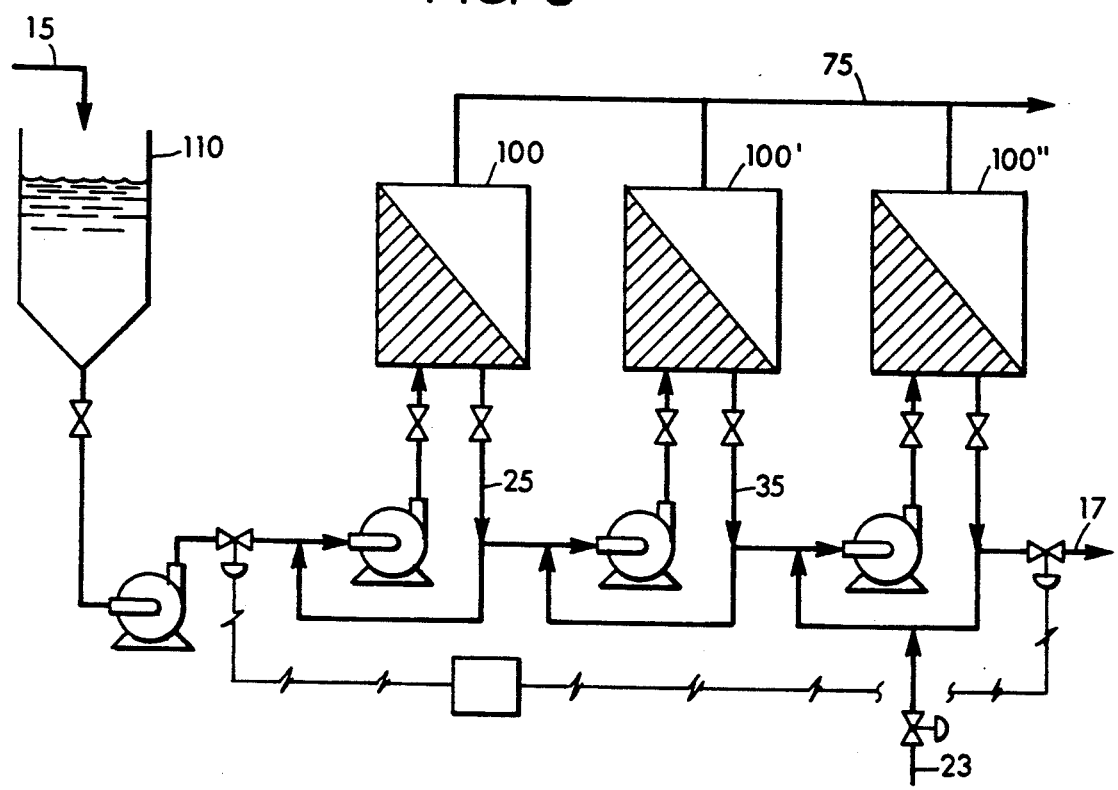
FIG. 3 is a schematic diagram of a processing arrangement for carrying out the dewatering process of the present invention using multiple membrane filters.
Figure 4:
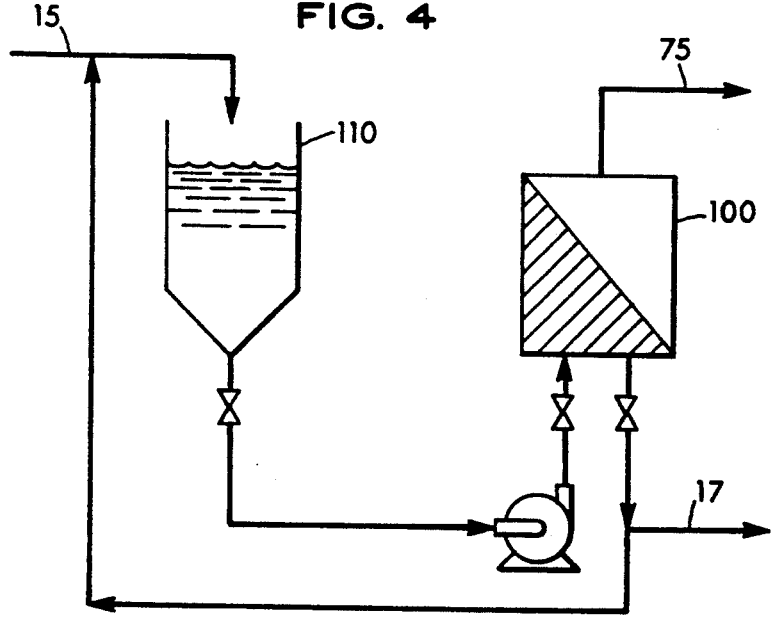
FIG. 4 is a schematic diagram of a batch processing arrangement for carrying out of the dewatering process of the present invention using a single membrane filter.
Figure 5:
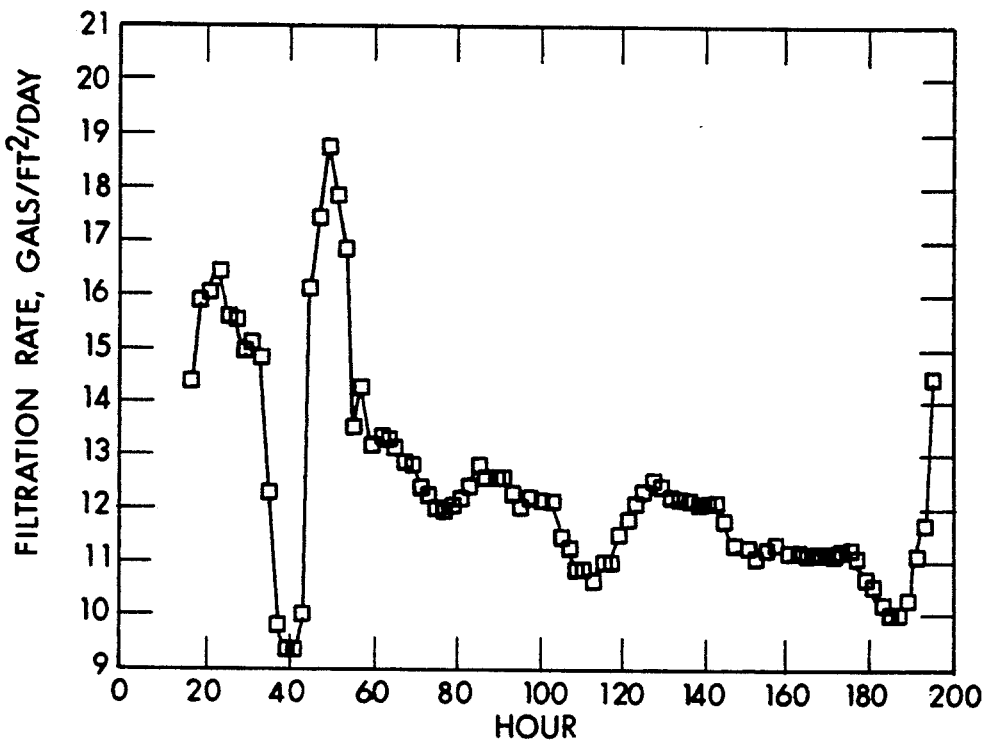
FIGS. 5 through 10 are graphs depicting flux or filtration rates and % solids as a function of time of operation for each of the three stages of a membrane filter operating pursuant to the invention.
Figure 6:
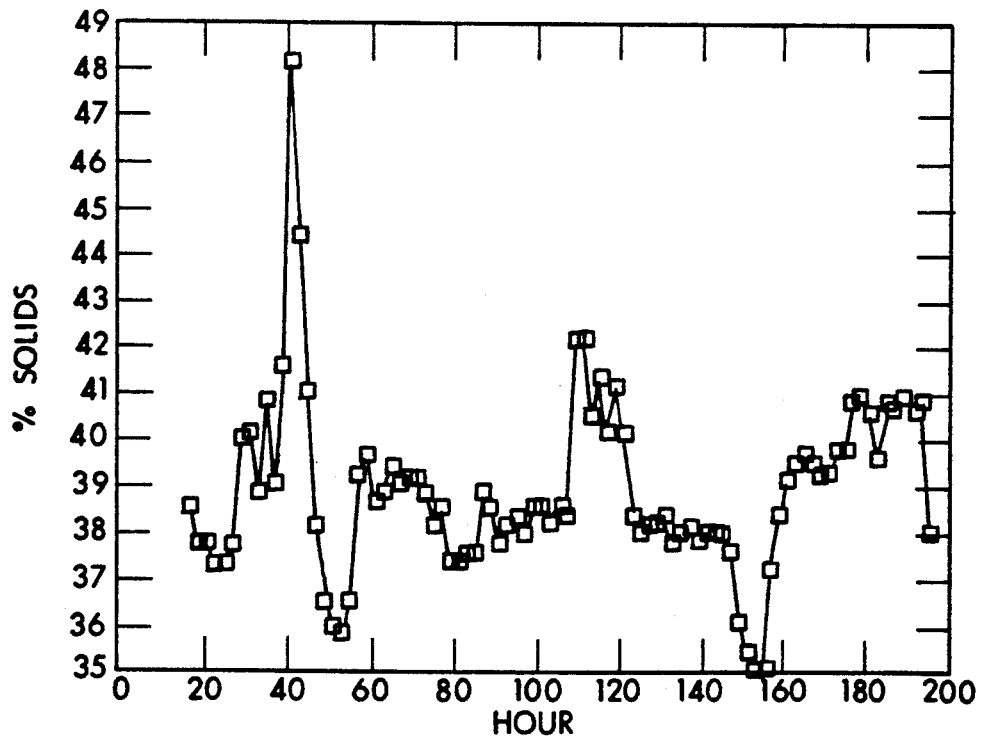
Figure 7:
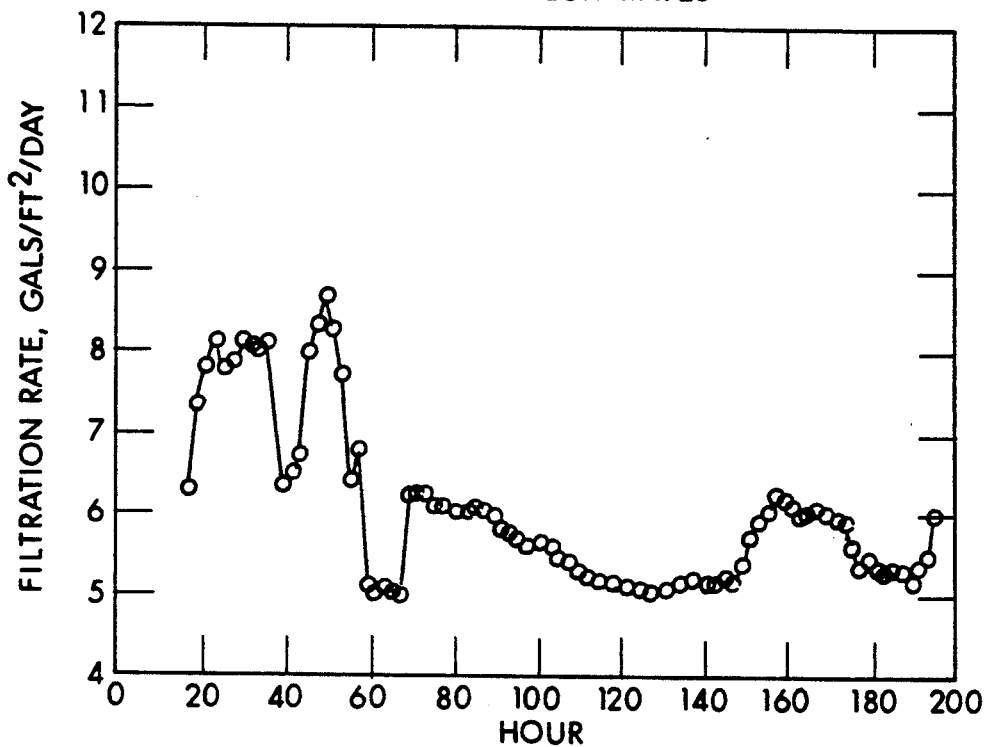
Figure 8:
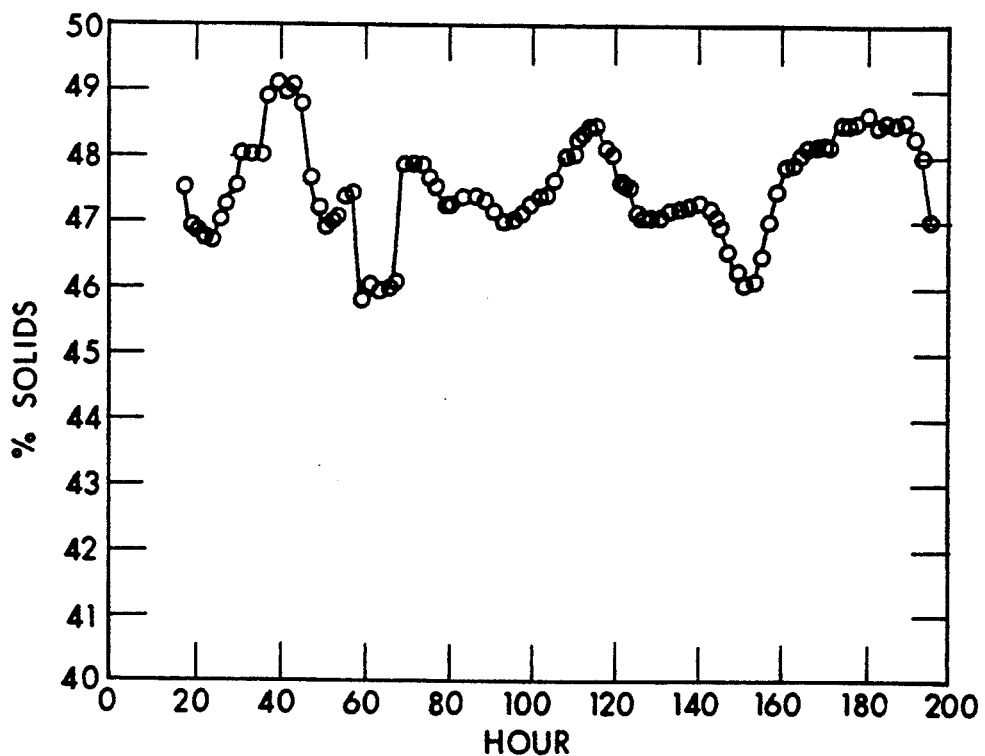
Figure 9:
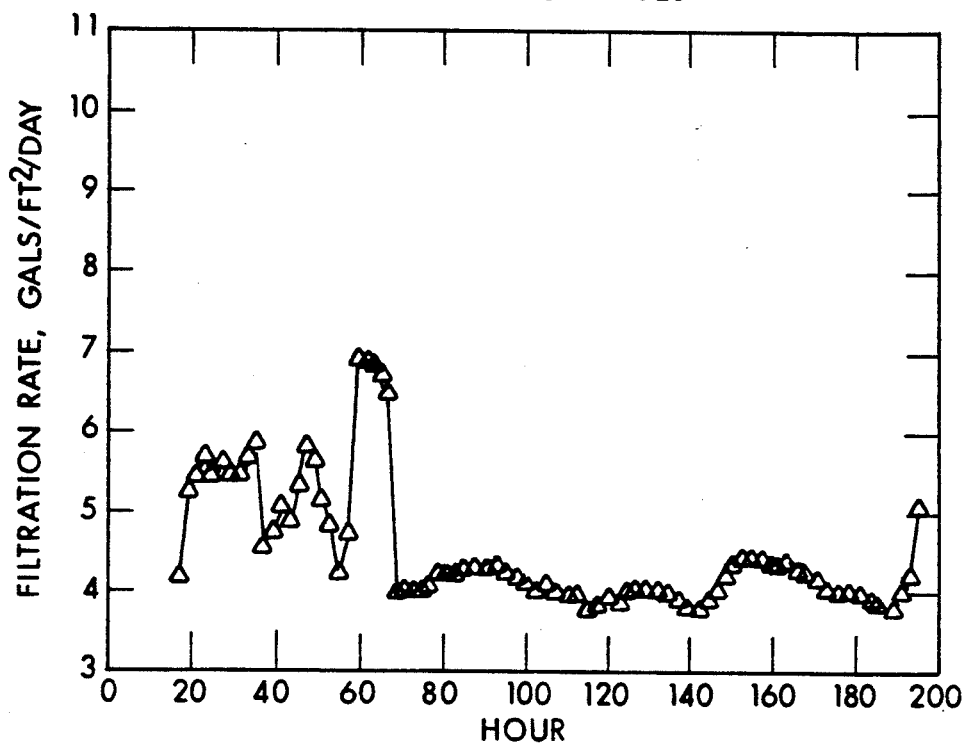
Figure 10:
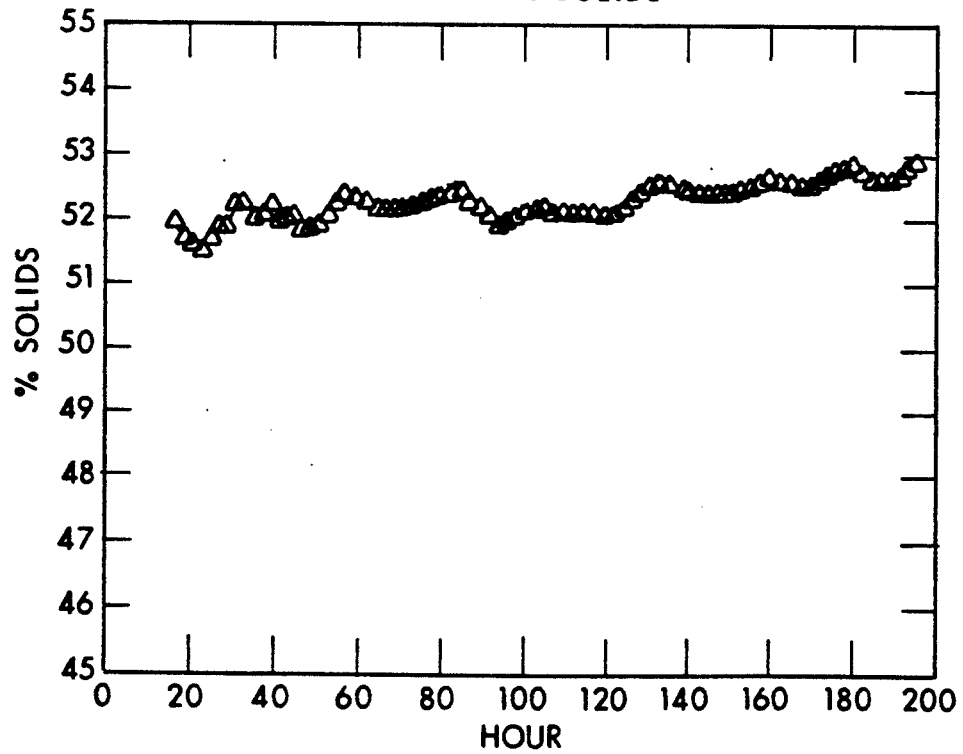
Figure 11:
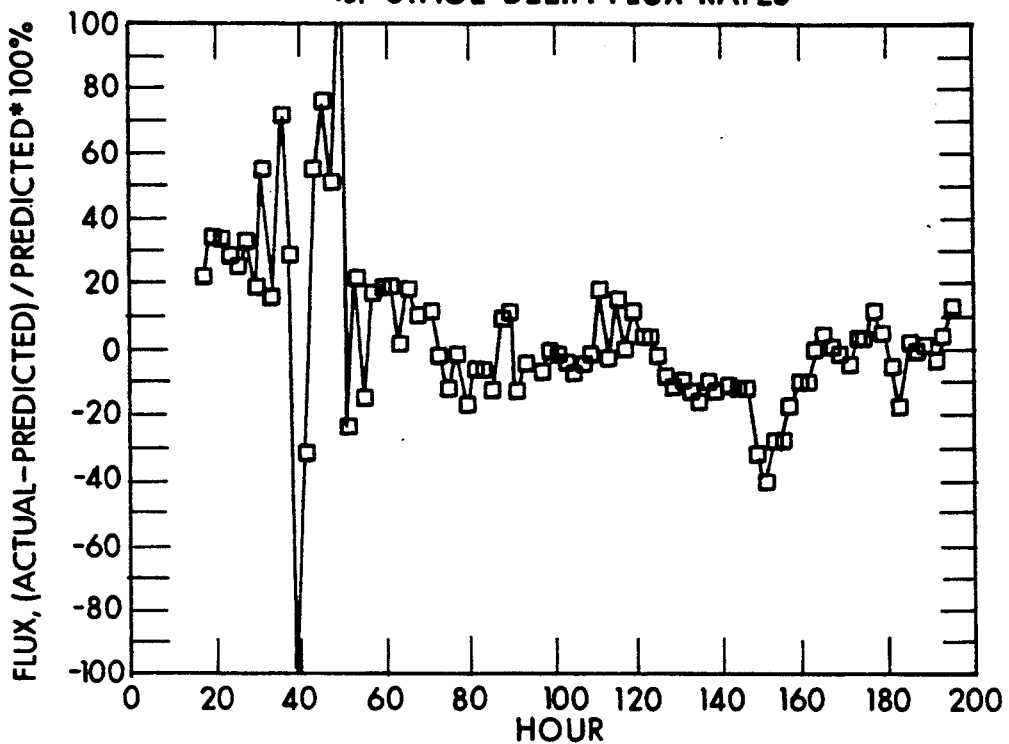
FIGS. 11 through 16 are graphs of a Delta Flux Rate, being the difference between the actual filtration rate at a discreet time, and a predicted rate, expressed as a % of the predicted rate, for each of three stages of a membrane filter operating pursuant to the invention.
Figure 12:
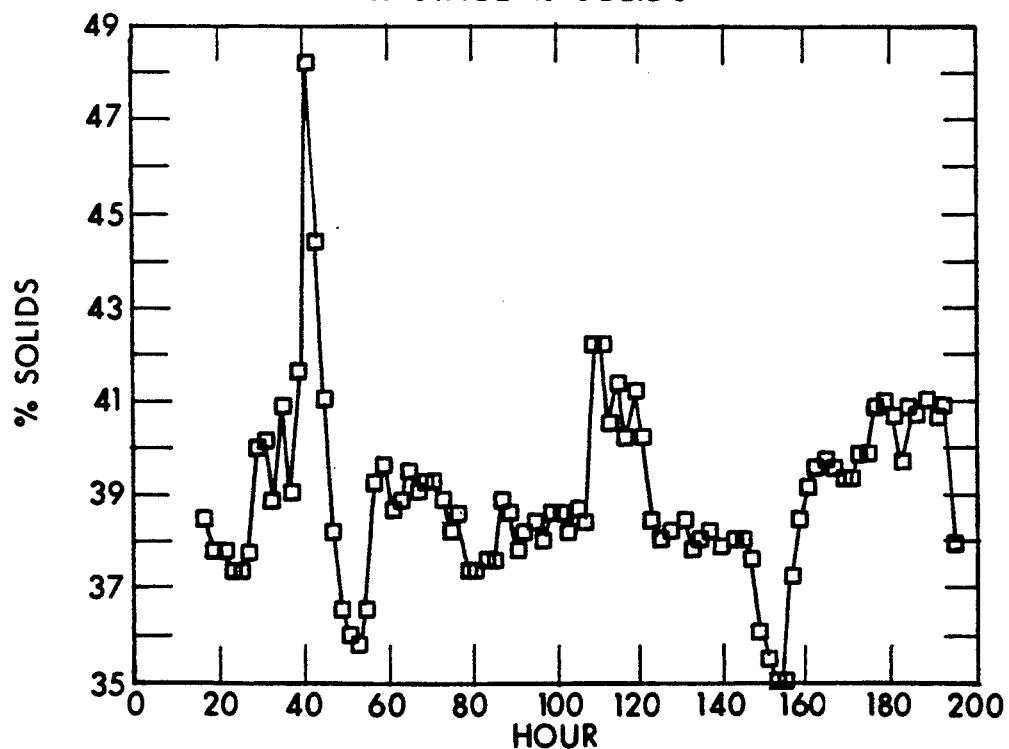
Figure 13:
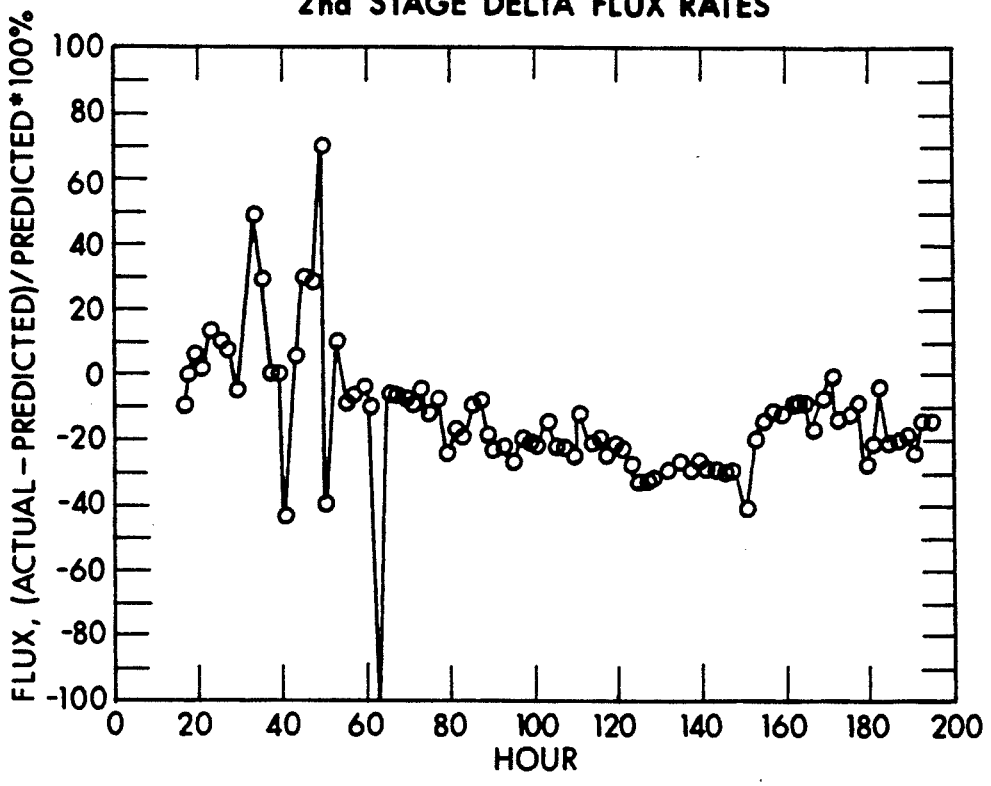
Figure 14:
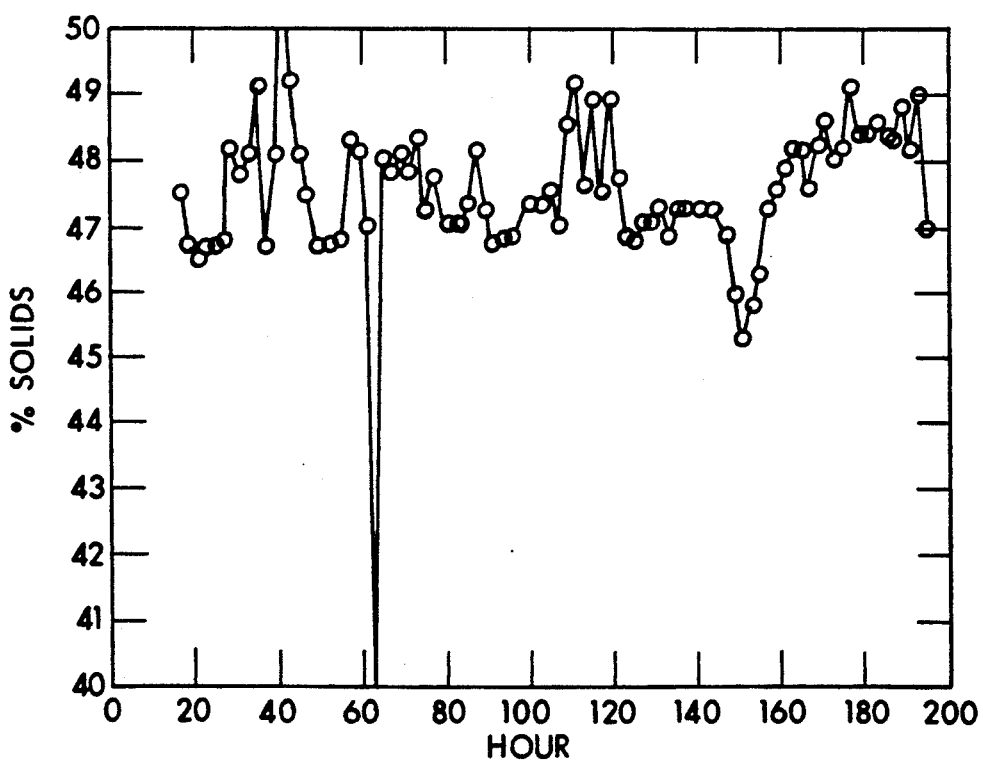
Figure 15:
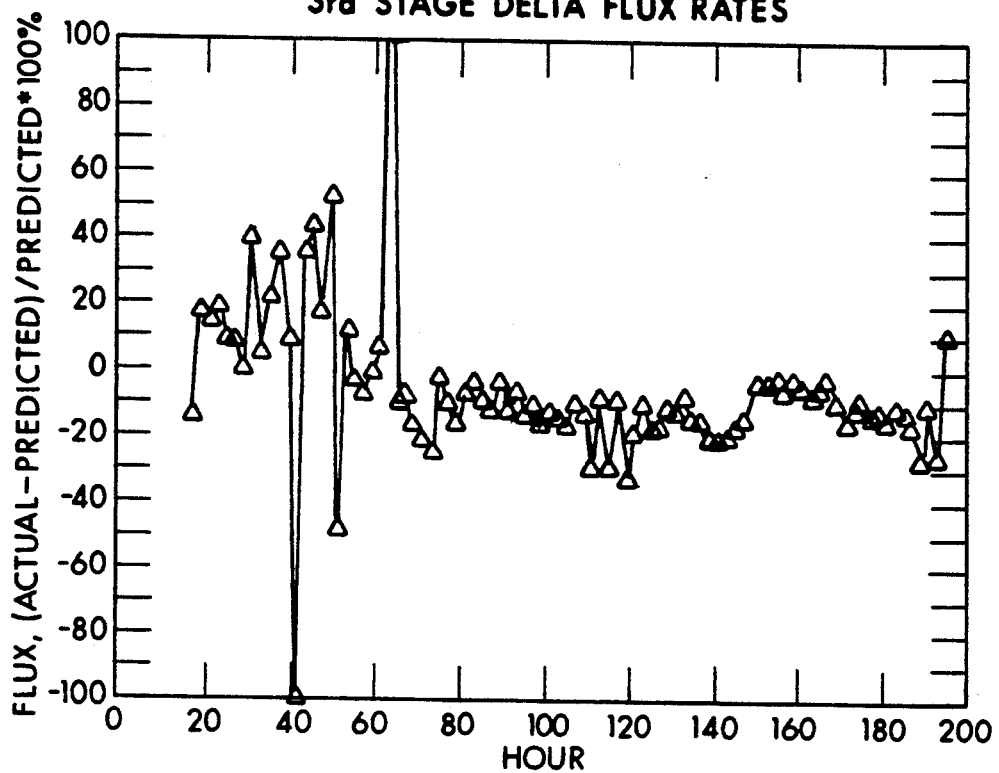
Figure 16:
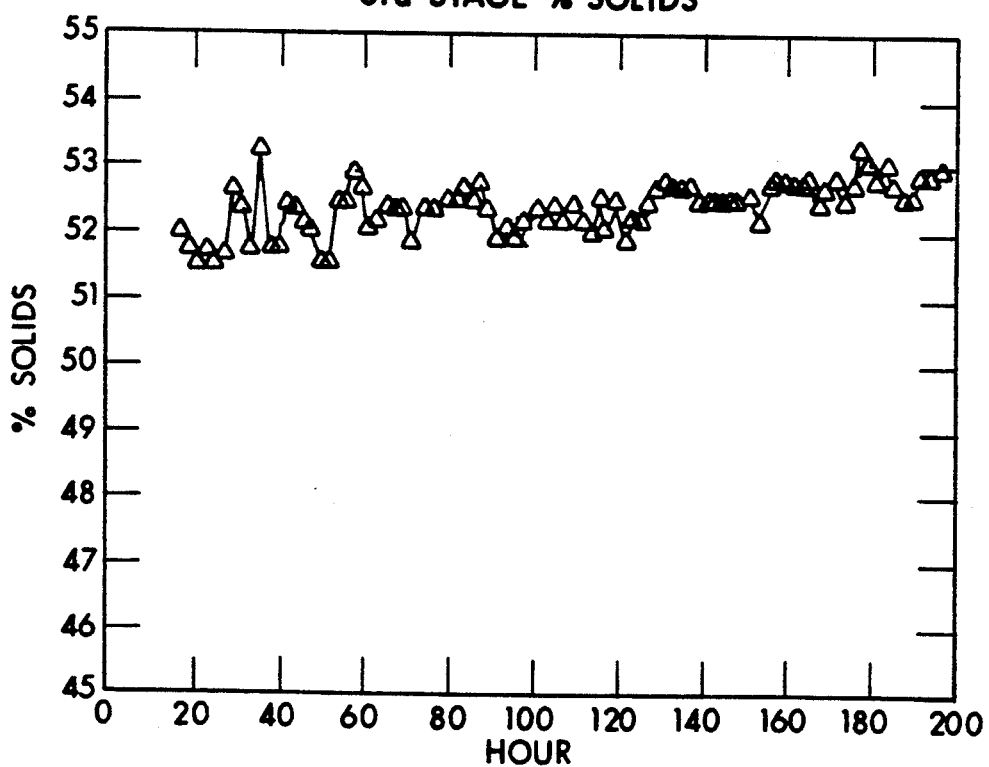

The dewatering process of the present invention may be carried out as illustrated in FIG. 3 using a plurality of semi-permeable membrane filter modules 100, or as illustrated in FIG. 4 using a single semi-permeable membrane filter module 100. In both arrangements, the aqueous kaolin slurry 15 to be dewatered is supplied to a holding or surge tank 110 and pumped therefrom at a controlled flow rate through at least one membrane filter module 100 wherein a portion of the water therein is removed, together with ions, e.g., residual bleaching agent, and dissolved salts, e.g., bleaching by-products, as a substantially solids free permeate 75 thereby producing a higher solids, more concentrated aqueous kaolin slurry 17 as a product.

In the arrangement illustrated in FIG. 3, a plurality of membrane filter modules 100, comprising at least an upstream filter module and at least a downstream filter module, and generally one or more intermediate filter modules, are staged in series-flow communication. In operation, the aqueous kaolin slurry would be pumped from the holding tank 110 to and through the upstream filter module 100 to remove a first portion of water, ions and dissolved salts therefrom as permeate 75 thereby producing as its discharge a somewhat more concentrated aqueous kaolin slurry 25. A first portion of the aqueous kaolin slurry 25 discharged from the upstream module 100 is recycled to the inlet of the upstream module 100 to be reintroduced thereto with incoming slurry from the tank 110 while the remainder of the aqueous kaolin slurry 25 discharged from the upstream module 100 is pumped to and through the next downstream intermediate filter module 100' wherein additional water, ions and dissolved salts are removed as permeate 75 thereby producing as its discharge a further concentrated aqueous kaolin slurry 35. A first portion of the aqueous kaolin slurry 35 discharged from the first intermediate filter module 100' is recycled through the first intermediate filter module 100', while the remainder thereof is passed to and through the next downstream filter module which may be either an additional intermediate filter module or the final downstream-most filter module 100". If the next downstream module is an additional intermediate module 100', portion of the aqueous slurry discharged is recycled and the remainder passed on to the next downstream module. This pattern is repeated until the final downstream filter module 100" is reached. The discharge slurry from the final downstream-most filter module 100" constitutes the desired higher solids, more concentrated product slurry 17.

In the single filter module arrangement illustrated in FIG. 4, the aqueous kaolin slurry to be dewatered is pumped from holding tank 110 to and through the single filter module 100 wherein a portion of the water therein, together with ions and dissolved salts, is removed therefrom as the permeate 75. All of the aqueous kaolin slurry discharged from the single filter module 100 is reintroduced to the tank 110 and recycled through the single filter module 100 until concentrated to the desired higher solids level. At that point, a portion of the discharge slurry is removed as product slurry 17 while the remainder is recycled to the tank 110 and mixed with incoming make-up feed 15.

In another aspect of the present invention, the effectiveness of semi-permeable membrane filtration in removing ions and dissolved salts with the water molecules when dewatering kaolin slurry may be applied to rinsing bleaching by-product and residual bleaching agents from the beneficiated kaolin. The presence of such bleaching by-product salts and residual bleaching agent degrades the brightness of the beneficiated kaolin product particularly if the beneficiated product is spray dried subsequent to conventional dewatering by mechanical means such as rotary vacuum filters. When processed in accord with the present invention, a substantial portion of the bleaching by-product salts, residual bleaching agents, and other undesirable ions, such as ferrous ions, will be removed when the aqueous kaolin clay slurry from the bleaching step is subjected to membrane filtration as the semi-permeable membrane is selected to be impervious, or nearly so, to kaolin solids but pervious to the flow of not only water molecules, but also dissolved salts and ions. Tests have shown that membrane filtration may be used in rinsing bleaching by-product salts and residual bleaching agent from the kaolin slurry whether the aqueous kaolin slurry being rinsed has a low solids content or a high solids content. The rinsing step may be advantageously incorporated into a multiple filter arrangement such as illustrated in FIG. 3 by adding rinse water 23 into the recycle portion of the aqueous kaolin slurry discharge from the downstream-most membrane filter module 100''. As this recycled slurry once again passes through the membrane filter module 100'', further salts and ions washed from the kaolin particles via the rinse water are removed in the permeate generated in the membrane filter module 100''. Preferably, the amount of water removed as permeate in the membrane filter module 100'' is at least equal to amount of rinse water added to the recycle slurry.

The effectiveness of the membrane filter in removing by-product bleaching salts and residual bleaching agent may also be advantageously utilized not only in conjunction with conventional low solids, flocculated state bleaching, but also with high solids, dispersed state bleaching. In conventional low solids, flocculated state bleaching, the aqueous kaolin slurry, typically at a solids content of 25-35% solids by weight, is acid flocculated at a pH of 2.5 to 3.5 prior to bleaching. The acid flocculated kaolin slurry is then bleached and subsequently dewatered in the flocculated state to a solids content of 55% to 60% solids by weight by conventional mechanical dewatering means such as a rotary vacuum filter. Prior to further drying the bleached kaolin slurry to commercially marketable levels, typically by spray drying a portion of the kaolin slurry and remaining the spray dried kaolin particles into the 55% to 60% solids slurry from the rotary vacuum filter, the acid flocculated slurry must be redispersed. To do so, the pH of the slurry is adjusted to a pH of about 6 to 7.5 by the addition of one or more of a number of conventional, commercially available dispersing agents, also known as deflocculants, such as sodium hydroxide, sodium silicate, sodium carbonate, sodium metaphosphate, and sodium polyacrylate. Unfortunately, residual by-product salt and residual dispersing agent remaining in the slurry being subjected to spray drying are known to cause an undesirable degradation in the brightness of the spray dried kaolin particles.

The use of membrane filtration to rinse bleached kaolin clay slurry in accordance with the present invention may be readily applied to high solids, dispersed state bleaching to produce a high solids product having a higher brightness than obtainable with conventional low solids, acid flocculated bleaching. When the aqueous kaolin clay is bleached in the dispersed state, it is bleached at a pH typically in the range of about 4.0 to 7.5, rather than in a flocculated state at a lower pH. Thus, it is not necessary to add deflocculating agents to the bleached slurry in order to redisperse the bleached slurry as in conventional processing, as a slurry which is bleached in the dispersed state will remain in the dispersed state. Consequently, the degradation of brightness typically experienced due to the presence of residual deflocculating agents and by-products is avoid.

Advantageously, such dispersed state bleaching may be carried at a high solids level, i.e., at a solids level of at least about 45% by weight, more advantageously at a solids level of at least about 55% by weight, by carrying out the bleaching process interstage of a multiple membrane filter arrangement such as the arrangement illustrated in FIG. 3, rather than prior to subjecting the slurry to dewatering. For example, the partially dewatered kaolin slurry leaving the intermediate membrane filter module 100'' could be passed through a bleaching stage and bleached in a dispersed state at high solids prior to be passed to the downstream-most membrane filter module 100'' wherein the bleaching by-product salts and any residual bleaching agent would be rinsed from the kaolin slurry as hereinbefore discussed in the permeate without any dilution of the slurry. One process suitable for carrying out such dispersed state bleaching at high solids is disclosed in commonly assigned U.S. Pat. No. 4,650,521 of Koppelman and Migliorini, for "Processing of Kaolinitic Clays at High Solids Under Acidic Conditions".

Although the particular slurry flow rates, slurry temperature and solids concentration will depend on the particular type of membrane filter utilized and, conversely, the particular type of membrane filter selected will be to some extent dependent upon these slurry parameters, in carrying out the process of the present invention, tests have shown that flux rate, that is the rate of water removal through the membrane is inversely proportional to the concentration of solids in the slurry being dewatered. For example, in one series of tests, the flux rate decreased by a factor of about 10 when the solids concentration in the slurry was increased from 25% solids by weight to 55% solids by weight. Additionally, tests have shown that the flux rate is directly proportional to the slurry flow rate through the channel which is indicated by the drop pressure from the inlet to the channel to the outlet of the channel, the greater the pressure drop through the channel, the greater the flow rate through the flow channel. For example, in a series of tests, the flux rate decreased by about 40% when the pressure drop through the flow channel, i.e., the slurry flow rate through the flow channel, decreased from a pressure drop of about 70 psi to a pressure drop of about 40 psi. However, tests have shown that the absolute level of the slurry fluid pressure at the inlet of the channel has relatively little effect on flux rate, there being experienced only a slight reduction in flux rate with an increase in the absolute level of the slurry fluid pressure.

The temperature of the kaolin slip being dewatered has also been found to influence the flux rate. Tests have shown that preheating the kaolin slip prior to dewatering results in an increase in passage of water through the membrane. For example, an increase in the temperature of the kaolin slip from ambient temperature (about 27° C.) to 40° C. resulted in a 21% increase in flux rate.

Accordingly, it is advantageous to preheat the kaolin slurry prior to subjecting the slurry to dewatering via membrane filtration, the exact level of preheating being limited by the permissible temperature exposure levels of the materials from which the membrane or other materials in the filtration module can experience without adverse effects.

One particularly advantageous method of preheating the kaolin slurry prior to dewatering is schematically illustrated in FIG. 1. As illustrated therein, heat is recovered from the exhaust product of the thermal evaporation unit 60 and utilized to preheat the kaolin slurry 15 being supplied to the dewatering unit 50 which comprises one or more membrane filtration modules 100. If the thermal evaporation unit 60 comprises a spray dryer, heat may advantageously recovered from the exhaust gas of the spray dryer by merely passing a heat exchange fluid in heat exchange relationship with the exhaust gages to recover heat from the exhaust gases and thereafter passing the heat exchange fluid in heat exchange relationship with the kaolin slurry 15, or more advantageously, heat may be recovered from the exhaust gases of the spray dryer in the manner disclosed in the aforementioned U.S. Pat. No. 4,642,904, and the condensate passed in heat exchange relationship with the aqueous clay slurry 15 so as to preheat the slurry prior to dewatering.

Additionally, it is estimated that the use of membrane filtration to dewater kaolin clay slurry in accordance with the present invention will be more economical than the conventional method of dewatering kaolin clay slurry via rotary vacuum filters, particularly with respect to low solids filtration and fine particle size kaolin slurries. Not only do membrane filtration systems generally have a lower capital cost for a given dewatering capacity than rotary vacuum filters, membrane filters will with little doubt be less expensive to operate than rotary vacuum filters. Further, by selecting the membrane filter to be impervious, or nearly so, so that no solids, or at least only a tolerably low level of solids with respect to pollution regulations, the need for impound ponds, as required with conventional dewatering systems to permit carryover of solids to settle out, is eliminated.

The filtration method of the present invention can be effectively practiced with microporous barriers other than those constructed from membranes. Microporous barriers comprised, e.g., of sintered metals are found to function effectively in the invention. A relatively narrow size distribution of pores, e.g. in the range of 0.005 to 0.1 micrometer is preferred, but such barriers having average pore size of up to about 5 micrometers are suitable.

Investigation of the filtration of kaolins by the present invention has established a basis for the surprising finding that fully dispersed (i.e. deflocculated) slurries of kaolin particles are readily and completely filtered by the invention, even where the particles are substantially smaller than the pore sizes of the barrier, and for the equally surprising finding that the kaolin filtration process may be continuously practiced for sustained periods of time without substantial loss in filtration rates or efficacy.

It thus appears that upon institution of the present process, the kaolin particles form a thin gel permeation layer or coating upon the surface of the microporous barrier which abounds the surface-parallel slurry flow. Surprisingly this layer quickly attains a limited and stable thickness, and in combination with the underlaying microporous barrier (which the gel permeation layer neither clogs nor impedes) thereafter serves as a stable filter which bars the transverse passage of even the submicrometer size kaolin particles—while permitting the ready passage of water, dissolved salts and the like as heretofore discussed. It is hypothesized that these results may obtain by virtue of the chemical and physical characteristics of the kaolin particles, e.g. in the latter respect because of platelet shapes which may facilitate formation of a thin gel layer while yet limiting overdevelopment of same. These points are illustrated in the following Examples.

EXAMPLE I

This Example demonstrates the successful filtration of a slurry of dispersed kaolin fines which are 100% finer than 0.5 micrometers with a substantial part of the size distribution being below 0.2 micrometers. This material would not be filterable by conventional means due to its extreme fineness. The slurry is also extremely dilute at 2% to 6% solids which exacerbates the problem for conventional filtration. Flocculation and settling in a conventional thickener will dewater the fines to about 20% to 25% solids; however, heavy flocculent dosages limit the recovered fines usage and at 20% solids the material is still too dilute for economical recovery.

Pursuant to this Example, a kaolin crude was wet processed to yield a dispersed 15% solids aqueous slurry having a P.S.D. such that 92% by weight of the particles were of less than 2 $\mu$m E.S.D. This dilute slurry was passed through a disc nozzle centrifuge and thereby separated into 2 parts by weight (of dry solids) of a "defined" product and 1 part by weight of "ultrafines". The ultrafine fraction had a P.S.D. (by weight) of 98%<1 micron, 96%<0.5 $\mu$m, and 73%<0.25 $\mu$m. This aqueous fraction of ultrafines at 5% solids was then filtered by the method of the invention by being passed across the surface of a Koch spiral membrane filter. The membrane comprised a polysulphone having an average pore size of about 0.01 micrometer. A pressure drop of 39 p.s.i. was maintained across the filter surface. Slurry feed rate was approximately 110 gal/min. Flux rate (see discussion in Example II) was approximately 31 gal permeate/ft$^2$/day. Substantially no colloidal material was passed through the filter (i.e., transverse to the membrane) with the apparently clear permeate, even though substantial quantities of colloidal particles smaller than the average membrane pore size were present in the feed kaolin slurry. The retentate output from the filter was a kaolin slurry having an increased 25% to 30% solids. This output can be treated in a number of ways including: (1) by being further filtered in a plate membrane to 55% solids; (2) by being thermally treated to evaporate additional water and bring the solids to 70%; and/or (3) by being mixed with coarser clay, flocculated and vacuum filtered to about 55% solids.

It is evident from this Example that the membrane filter can address all of the limitations of current technology for the dewatering of these fines. The membrane filter has no difficulty filtering the fines up to 40% solids, and in some instances can effect concentration of the fines to 55% solids. No flocculants are used so the fines do not suffer quality problems and at 40% to 55% solids the material can be economically evaporated or spray-dried to yield a product.

EXAMPLE II

The data in this Example demonstrate that the filtration rates achieved pursuant to the invention are very stable over time. In this Example the microporous barrier comprised a polysulphone membrane having an average pore size of 0.01 μm. A three stage arrangement was used of the type shown in FIG. 3, the total filter surface area being 1,000 ft$^2$. The filtration rate or flux rate is measured as the gallons of water removed per square foot of membrane area per day. For most prior art membrane applications the filtration rate continually declines over time due to steady growth of a film of solids on the membrane surface, referred to as the gel permeation layer. This film normally slows migration of water to the membrane surface, reducing filtration rate. The growth rate of this film and the resulting decline in filtration rate may be very fast (hours) to very slow (days); however, filtration rate will become so low that the membrane must be shut down and washed. Surprisingly for the processing of kaolin clay, this does not appear to occur. A film or gel permeation layer does grow; however, after 36 to 48 hours of operation a steady state is reached where the filtration rate stops declining as long as the clay slurry % solids is constant.

The filtration rate data from three runs on the 1,000 square foot of area, three-stage membrane is depicted in FIGS. 5 through 10. Flux or filtration rates and % solids are shown over time for each of the three stages that made up the membrane. All three stages show unstable and declining filtration rates from start-up at hour 18 to about hour 60. Feed solids (FIGS. 6, 8 and 10) were unstable during this period which is reflected by the extreme instability of both % solids and filtration for the first stage. Once the instability associated with the feed solids was stopped, the filtration rate stability could be better judged. From hour 60 to the end of the run the first and second stage filtration rates appear to decline. However, the dips in filtration rate in the first stage at hour 105 and hour 145 are accompanied by a significant rise in % solids which would cause lower filtration rates. To determine if the filtration rate is stable or declining over time for the first and second stage the effect of changing solids must be compensated for. The easiest way to do this is to use the average data for the run to produce an equation to calculate the effect of % solids on filtration rate. This equation is then used to calculate a predicted filtration for the measured % solids at a discreet time. The difference between the actual filtration rate at that time and the predicted rate is then calculated as a percentage of the predicted rate. If the filtration rate is constant with respect to time then this percentage will start positive and decline during the run until it is negative. This is because the actual rate will start out above that predicted from average data and will eventually drop to below that predicted from average data. If the filtration rate goes through an initial decline and then reaches a stable condition, then this percentage will start out positive, but will rapidly drop to a negative value that is then relatively unchanging. If the filtration rate is steady enough with respect to time then this calculated value will increase during a short duration increase in % solids and decline during a short duration decrease in % solids. This is because the rate is so stable it does not drop as much as predicted with an increase in % solids or rise as much as predicted with a decrease in % solids. The graphs of FIGS. 11 through 16 entitled ". . . Delta Flux Rates" show the behavior described for the initial filtration rate decline followed by a final steady rate scenario. This refutes the possible argument that the first and second stage filtration rates are declining over time. This apparent decline is linked to variable % solids, not a time-related fouling. No such problem exists with the third stage data. It clearly reaches a steady state. This steady filtration rate achieved in the present invention is very unusual and very unexpected for membrane technology. The data indicates that the filtration rate stability can be indefinite in duration for a properly controlled system.

EXAMPLE III

This Example demonstrates that substantial differences in the pore size of the microporous barrier does not result in significant differences in filtration rate for microporous barriers operating under similar conditions. The reason for this is that the kaolin forms a de facto secondary membrane in the form of the aforementioned gel permeation layer. This hypothesis is further supported by the 100% retention of clay regardless of the barrer pore size.

In FIGS. 17 and 18 filtration rates are graphed for an aqueous kaolin slurry as a function of % solids, using two different membrane filters. In FIG. 17, the kaolin was unbleached, fully dispersed, and had a P.S.D. of approximately 99%<2 μm, 90%<1 μm and 40-50-%<0.25 μm (all by weight). The fully dispersed kaolin in FIG. 18 was a bleached feed having a P.S.D. as just set forth for the unbleached material. The membrane identified as "GR40" was a polysulphone material produced by Niro Corporation having an average pore size of 0.01 micrometers; the "GRM" membrane (Niro) was also a polysulphore material, having an average pore size of 0.1 μm. The test data shows that over the majority of the % solids range in question there is a 10% or less difference in filtration rate even through the two difference in filtration rate even through the two membranes have 1000% difference in pore size. In fact, one shows an advantage at lower solids and the other at higher solids.

EXAMPLE IV

Using a three stage arrangement as in FIG. 3, slurries of a fully dispersed kaolin having an approximate P.S.D. of 99%<2 μm, 90%<1 μm and 40-50% <0.25 μm (all by weight) were filtered. The solids to the first stage was approximately 38 to 41% in the several runs evaluated. Filtration rates were evaluated for the UC7-M and UC7-600 membranes of Koch Abcor Corp. The former is an 0.1 μm membrane (average pore size); the latter is a 1 μm (average pore size) membrane. Even with this very large difference in pore size, 100 times, the difference in filtration was relatively small, being about 10% to 30%. By the end of the runs the difference in rates was steady, at about 10%.

EXAMPLE V

In this Example, filtrations of slurries of fine-sized kaolins pursuant to the invention were effected using as the microporous barriers, sintered metal tube produced by DuPont. The tubes used were sintered stainless steel, and had a 3/16 inch wall thickness. The pore size averaged from 1 to 2 μm. Normally when these tubes are to be used for prior art filtration, an in-situ membrane is first deposited, e.g., the type of polymeric membranes used in the prior Examples herein. In the present Example, however, no such membrane is used; instead it is unexpectedly found that the kaolin itself (as previously discussed) forms a gel permeation layer on the interior wall of the sintered metal tube, which thereafter effectively functions as would an in-situ formed membrane.

The feed comprised a 25% solids aqueous slurry of a kaolin normally used as a calciner feed (for producing a calcined kaolin, e.g. as in McConnell et al, U.S. Pat. No. 4,381,948, the kaolin having 99%<2 μm, 90%<1 μm and 40–50%<0.25% μm E.S.D. (all by weight). This slurry was passed through a series filter arrangement as in FIG. 3—except that only two stages were used. The retentate output from the filter was at 60% solids, and was in ready condition for spray drying to provide the feed product for the calciner. The permeate passing through the walls of the sintered metal tubes was found to be virtually clear and free of kaolin fines.

While the present invention has been particularly set forth in terms of specific embodiments thereof, it will be understood in view of the instant disclosure, that numerous variations upon the invention yet reside within the scope of present teaching. Accordingly the invention is to be broadly construed, and limited only by the scope and spirit of the claims now appended hereto.

What is claimed is:

1. A process for producing a high solids aqueous slurry of a beneficiated kaolin comprising:
   (a) subjecting an impure crude kaolin clay to wet processing including a size classification step, to recover a beneficiated kaolin fraction having a particle size distribution such that at least 90% by weight of said particles are of less than 2 μm E.S.D.;
   (b) forming said kaolin fraction into a dilute aqueous slurry of deflocculated kaolin particles dispersed in water;
   (c) filtering said dilute aqueous slurry of dispersed kaolin particles by flowing the slurry generally parallel to and in contact with the surface of a microporous barrier while maintaining a pressure drop across the barrier in a direction transverse to the slurry flow, thereby forming a gel permeation layer of kaolin overlying the said surface of the microporous barrier; said layer and underlying surface being substantially impervious to the passage of clay solids therethrough while being pervious to the passage therethrough of water molecules, ions and dissolved salts; whereby water molecules, ions and dissolved salts are caused to pass through said barrier, thereby increasing the concentration of the solids in said kaolin slurry; and
   (d) collecting the water having passed through said barrier as a substantially solids-free permeate and, separately therefrom, collecting as the retentate the more concentrated aqueous slurry of beneficiated kaolin particles from which said permeate has been separated.

2. A method in accordance with claim 1, further including thermally evaporating additional water from the more concentrated aqueous slurry of beneficiated kaolin particles to provide a high solids product slurry.

3. A method in accordance with claim 1, wherein said microporous barrier comprises a semi-permeable polymeric membrane.

4. A method in accordance with claim 1, wherein said microporous barrier comprises a thin sintered metal layer.

5. A method in accordance with claim 1, wherein said microporous barrier has an average pore size of from about 0.005 to 2 μm.

6. A method in accordance with claim 5, wherein said microporous barrier has an average pore size of about 0.005 μm to 0.1 μm.

7. A method in accordance with claim 5, wherein said kaolin has a PSD such that at least 90% by weight of the kaolin particles are of less than 0.5 μm E.S.D.

8. A method in accordance with claim 7, wherein at least 50% by weight of the kaolin particles are of less than 0.25 μm E.S.D.

9. A method in accordance with claim 5, wherein said slurry subjected to filtration in step (c) has from 2 to 6% kaolin solids.

10. A process for increasing the solids content of an aqueous slurry of a dispersed kaolin, which has an initial solids level of 40% or less, and a kaolin particle size distribution such that at least 90% by weight of said particles are of less than 2 μm E.S.D.; comprising: flowing the surry generally parallel to and in contact with the surface of a microporous barrier while maintaining a pressure drop across the barrier in a direction transverse to the slurry flow, thereby forming a gel permeation layer of kaolin overlying the said surface of the microporous barrier; said layer and underlying surface being substantially impervious to the passage of clay solids therethrough while being pervious to the passage therethrough of water molecules, ions and dissolved salts; whereby water molecules, ions and dissolved salts are caused to pass through said barrier as a substantially solids-free permeate, thereby increasing the concentration of the solids in said kaolin slurry; and collecting as the retentate the more concentrated aqueous slurry of kaolin particles from which said permeate has been separated.

11. A method in accordance with claim 10, further including thermally evaporating additional water from the more concentrated aqueous slurry of beneficiated kaolin particles to provide a high solids product slurry.

12. A method in accordance with claim 10, wherein said microporous barrier comprises a semi-permeable polymeric membrane.

13. A method in accordance with claim 10, wherein said microporous barrier comprises a thin sintered metal layer.

14. A method in accordance with claim 10, wherein said microporous barrier has an average pore size of about 0.005 μm to 2 μm.

15. A method in accordance with claim 14, wherein said microporous barrier has an average pore size of about 0.005 μm to 0.1 μm.

16. A method in accordance with claim 14, wherein said kaolin has a PSD such that at least 90% by weight of the kaolin particles are of less than 0.5 μm E.S.D.

17. A method in accordance with claim 16, wherein at least 50% by weight of the kaolin particles are of less than 0.25 μm E.S.D.

18. A method in accordance with claim 14, wherein the initial solids content of said slurry is from 2 to 6%.

19. A process for producing a high brightness kaolin clay product consisting essentially of beneficiated kaolin clay particles in a high solids aqueous slurry, said process comprising:
   a. subjecting an impure crude kaolin clay to wet processing including a size classification step, as to provide a dilute aqueous slurry of beneficiated kaolin particles which are dispersed in water and having a particle size distribution such that at least 90% by weight of said particles are of less than 2 μm E.S.D.

b. subjecting said dilute aqueous slurry of beneficiated dispersed kaolin particles to membrane filtration by flowing said dilute aqueous slurry parallel to the surface of a semi-permeable membrane, while imposing a pressure differential across the membrane surface; said semi-permeable membrane being substantially impervious to the passage of clay solids therethrough and pervious to the passage therethrough of water molecules, ions and dissolved salts, whereby water molecules, ions and dissolved salts are caused to pass through said semi-permeable membrane, thereby increasing the concentration of the solids in said kaolin slurry;

c. collecting the water having passed through said membrane as a substantially solids-free filtrate and, separately therefrom, collecting said aqueous kaolin slurry as a more concentrated aqueous slurry of beneficiated kaolin particles; and d. thermally evaporating additional water from the more concentrated aqueous slurry of beneficiated kaolin particles to provide a high solids product slurry.

20. A process as recited in claim 19 wherein said dilute aqueous slurry of beneficiated kaolin particles is pumped under pressure through an axially elongated flow channel bounded at least in part along the length thereof by a semi-permeable membrane in a flow substantially parallel to the axis of said elongated flow channel, said flow channel having an inlet at one end thereof for receiving said dilute aqueous kaolin slurry and an outlet at the other end thereof for discharging said more concentrated aqueous kaolin slurry.

21. A process as recited in claim 20, wherein said dilute aqueous slurry of beneficiated kaolin particles is pumped through said axially elongate flow channel at slurry pressure drop from the slurry inlet to the slurry outlet ranging of at least about 40 psi.

22. A process as recited in claim 20, wherein said dilute aqueous slurry of beneficiated kaolin particles is preheated prior to being pumped through said axially elongated flow channel.

23. A process as recited in claim 22, wherein said dilute aqueous slurry of beneficiated kaolin particles is pumped into said axially elongated flow channel at a slurry inlet temperature of at least about 40° C.

24. A process as recited in claim 19, further comprising subjecting said dilute aqueous slurry of beneficiate kaolin particles to bleaching in dispersed a state.

25. A process as recited in claim 24 further comprising subjecting said dilute aqueous slurry of beneficiated kaolin particles to bleaching during the membrane filtration step.

26. A process as recited in claim 25 wherein the bleaching agent is selected from the group consisting essentially of cationic metal salts of the dithionite ion, the hypochlorite ion, the hyposulfite ion, the peroxide ion, the perborate ion, the perchlorate ion, and mixtures thereof.

27. A process as recited in claim 25 wherein the bleaching step is carried out a pH ranging from 4.0 to 7.5.

28. A process as recited in claim 19 wherein the dilute aqueous slurry of beneficiated kaolin particles to be subjected to membrane filtration has a solids content of from about 5% to about 50% b weight.

29. A process as recited in claim 28 wherein the concentrated aqueous surry of beneficiated kaolin product produced via membrane filtration has a solids content of from about 25% to 75% by weight.

30. A process as recited in claim 19 wherein the dilute aqueous slurry of beneficiated kaolin particles comprises an aqueous slurry of fine-particle size kaolin particles.

31. A process as recited in claim 30 wherein the aqueous slurry of fine-particle size kaolin particles comprises an aqueous slurry of kaolin particles having a particle size distribution of at least about 90% by weight less than 2 μm in equivalent spherical diameter.

32. A process for rinsing a high brightness kaolin clay product consisting essentially of an unrinsed aqueous slurry of bleached kaolin clay particles in order to remove bleaching by-product salts and residual bleaching agent therefrom, said process comprising subjecting said unrinsed aqueous slurry of bleached kaolin particles to membrane filtration to provide a rinsed aqueous slurry of bleached kaolin particles and a substantially solids-free filterate containing dissolved bleaching by-product salts and residual bleaching agent.

33. A process as recited in claim 32 wherein the step of subjecting said unrinsed aqueous slurry of bleached kaolin particles to membrane filtration to rinse said aqueous slurry of kaolin particles comprises:

a. bringing said unrinsed aqueous slurry of bleached kaolin particles in contact with a semi-permeable membrane, said semi-permeable membrane being substantially impervious to the passage of clay solids therethrough and pervious to the passage therethrough of water molecules, ions and dissolved salts;

b. imposing a pressure differential across said semi-permeable membrane whereby water molecules, ions and dissolved salts are caused to pass through said semi-permeable membrane thereby increasing the concentration the solids in said kaolin slurry and removing bleaching by-product salts and residual bleaching agent therefrom; and c. collecting the water having passed through said membrane as a substantially solids-free filterate and, separately therefrom, collecting said aqueous kaolin slurry as a more concentrated, rinsed aqueous slurry of bleached kaolin particles.

34. A process as recited in claim 33 wherein said unrinsed aqueous slurry of bleached kaolin particles is pumped under pressure through an axially elongated flow channel bounded at least in part along the length thereof by a semi-permeable membrane in a flow substantially parallel to the axis of said elongated flow channel, said flow channel having an inlet at one end thereof for receiving said unrinsed aqueous kaolin slurry and an outlet at the other end thereof for discharging said more concentrated, rinsed aqueous kaolin slurry, said semi-permeable membrane being substantially impervious to the passage of clay solids therethrough and pervious to the passage of water molecules, ions and dissolved salts therethrough.

35. A process for producing a high brightness kaolin clay product consisting essentially of fine-particle size beneficiated kaolin clay particles in a high solids aqueous slurry, said process comprising:

a. subjecting impure crude kaolin clay to wet processing in such a manner as to provide a dilute aqueous slurry of fine-particle size beneficiated kaolin particles dispersed in water at a solids content of from about 15% to 40% solids by weight and having a particle size distribution of at least about 90% by weight less than 2 μm in equivalent spherical diameter;

b. subjecting said dilute aqueous slurry of beneficiated kaolin particles to membrane filtration to provide a substantially solids-free filterate and a more concentrated aqueous slurry of beneficiated kaolin particles having a solids content of from about 45% to about 60% solids by weight; and c. thermally evaporating additional water from the more concentrated aqueous slurry of beneficiated kaolin particles to provide a higher solids product slurry.

36. A process as recited in claim 35 wherein the step of subjecting said dilute aqueous slurry of beneficiated kaolin particles to membrane filtration to provide a more concentrated aqueous slurry of beneficiated kaolin particles and a substantially solids-free filterate comprises:

a. bringing said dilute aqueous slurry of beneficiated kaolin particles in contact with a semi-permeable membrane, said semi-permeable membrane being substantially impervious to the passage of clay solids therethrough and pervious to the passage therethrough of water molecules, ions and dissolved salts;

b. imposing a pressure differential across said semi-permeable membrane whereby water molecules, ions and dissolved salts are caused to pass through said semi-permeable membrane thereby increasing the concentration the solids in said kaolin slurry; and c. collecting the water having passed through said membrane as a substantially solids-free filtrate and, separately therefrom, collecting said aqueous slurry of beneficiated kaolin particles.

37. A process as recited in claim 36 wherein said dilute aqueous slurry of beneficiated kaolin particles is pumped under pressure through an axially elongated flow channel bounded at least in part along the length thereof by a semi-permeable membrane in a flow substantially parallel to the axis of said elongated flow channel, said flow channel having an inlet at one end thereof for receiving said dilute aqueous kaolin slurry and an outlet at the other end thereof for discharging said more concentrated aqueous kaolin slurry, said semi-permeable membrane being substantially impervious to the passage of clay solids therethrough and pervious to the passage of water molecules, ions and dissolved salts therethrough.

38. A process as recited in claim 37 wherein said dilute aqueous slurry of beneficiated kaolin particles is preheated prior to being pumped through said axially elongated flow channel.

39. A process recited in claim 38 wherein said dilute aqueous slurry of beneficiated kaolin particles is pumped into said axially elongated flow channel at a slurry inlet temperature of at least about 40° C.

40. A process as recited in claim 34 further comprising subjecting said dilute aqueous slurry of beneficiated kaolin particles to bleaching during the membrane filtration step.

41. A process as recited in claim 40 further comprising subjecting said dilute aqueous slurry of beneficiated kaolin particles to bleaching in a dispersed state at a pH ranging from about 4.0 to 7.5.

42. A process as recited in claim 41 wherein the bleaching agent is selected from the group consisting essentially of cationic metal salts of the dithionite ion, the hypochlorite ion, the hyposulfite ion, the peroxide ion, the perborate ion, the perchlorate ion, and mixtures thereof.

* * * * *

UNITED STATES PATENT AND TRADEMARK OFFICE
CERTIFICATE OF CORRECTION

PATENT NO. : 5,227,349

DATED : July 13, 1993

INVENTOR(S) : Kirt L. Matthews and William E. Thompson

It is certified that error appears in the above-identified patent and that said Letters Patent is hereby corrected as shown below:

At Column 6, line 38, correct the spelling of "lay" to "clay".

At Column 6, lines 48 & 49, correct the spelling of "carboxyolic" to "carboxylic".

At Column 6, line 23, change "invention." to read -- invention; and --.

At Column 7, lines 29 & 30, "periodixe ion" should read "periodate ion".

At Column 12, line 12, "by-products is avoid." should read "by-products is avoided."

At Column 16, line 35, correct the spelling of "polysulphore" to "polysulfone".

Signed and Sealed this

Seventeenth Day of May, 1994

*Attest:*

BRUCE LEHMAN

*Attesting Officer*    *Commissioner of Patents and Trademarks*